United States Patent [19]

Geczy

[11] Patent Number: 4,560,014

[45] Date of Patent: Dec. 24, 1985

[54] THRUST BEARING ASSEMBLY FOR A DOWNHOLE DRILL MOTOR

[75] Inventor: Bela A. Geczy, Orange, Calif.

[73] Assignee: Smith International, Inc., Newport Beach, Calif.

[21] Appl. No.: 365,614

[22] Filed: Apr. 5, 1982

[51] Int. Cl.[4] .............................................. E21B 4/02
[52] U.S. Cl. .................................... 175/107; 175/337; 384/123; 384/285
[58] Field of Search ......................... 175/107, 337, 17; 384/123, 121, 284, 285, 424, 420, 107, 307, 308; 415/502, 110-112

[56] References Cited

U.S. PATENT DOCUMENTS

| | | | |
|---|---|---|---|
| T102,901 | 4/1983 | Offenbacher | 29/149.5 R |
| 957,797 | 5/1910 | Parsons et al. | 384/424 |
| 1,557,137 | 10/1925 | Brincil | 384/284 |
| 2,268,869 | 1/1942 | Given | . |
| 3,480,341 | 11/1969 | Hickernell | 384/95 |
| 3,823,030 | 7/1974 | Hudson | . |
| 3,982,859 | 9/1976 | Tschirky et al. | 175/107 X |
| 4,141,605 | 2/1979 | Riordan et al. | 308/26 |
| 4,190,301 | 2/1980 | Lachonious et al. | 175/330 X |
| 4,220,380 | 9/1980 | Crase et al. | 175/107 X |
| 4,225,196 | 9/1980 | Gray | 384/121 X |
| 4,260,031 | 4/1981 | Jackson, Jr. | 175/107 |
| 4,260,203 | 4/1981 | Garner | 308/8.2 |
| 4,295,535 | 10/1981 | Crase et al. | 175/107 X |
| 4,410,054 | 10/1983 | Nagel et al. | 175/107 |
| 4,468,138 | 8/1984 | Nagel | 384/303 |

FOREIGN PATENT DOCUMENTS 578318 6/1946 United Kingdom .
2054064 2/1981 United Kingdom .

OTHER PUBLICATIONS

Cast Bronze Thrust Bearing Design Manual, May 1967, Cast Bronze Bearing Institute, Inc., (Publisher).
P. 2136, *Handbook of Chemistry & Physics*, 40th Edition.
Pp. 195 and 196 of Dana's Manual of Mineralogy, revised by Cornelius S. Hurlbut, Fifteenth Edition, 1941.

*Primary Examiner*—James A. Leppink
*Assistant Examiner*—Thuy M. Bui
*Attorney, Agent, or Firm*—Price, Gess & Ubell

[57] ABSTRACT

A bidirectional thrust bearing assembly is used between a downhole fluid motor and a rock bit for drilling oil wells. The bearing assembly has a stationary housing with radial journal bearing sleeves and a rotatable drive shaft also having radial bearing sleeves. A pair of oppositely facing thrust bearing rings are mounted in the housing. A second pair of thrust bearing rings are mounted on the shaft so as to have faces opposing the bearing faces on the first pair of rings. Belleville springs resiliently bias a pair of the thrust bearing rings apart and carry the thrust load between such rings. Each ring has a plurality of inserts of hard material, preferably polycrystalline diamond, at the bearing surface. Means are provided for circulating drilling fluid from the motor through the thrust bearing faces for forming hydrodynamic fluid bearing films in the bearing interfaces.

52 Claims, 17 Drawing Figures

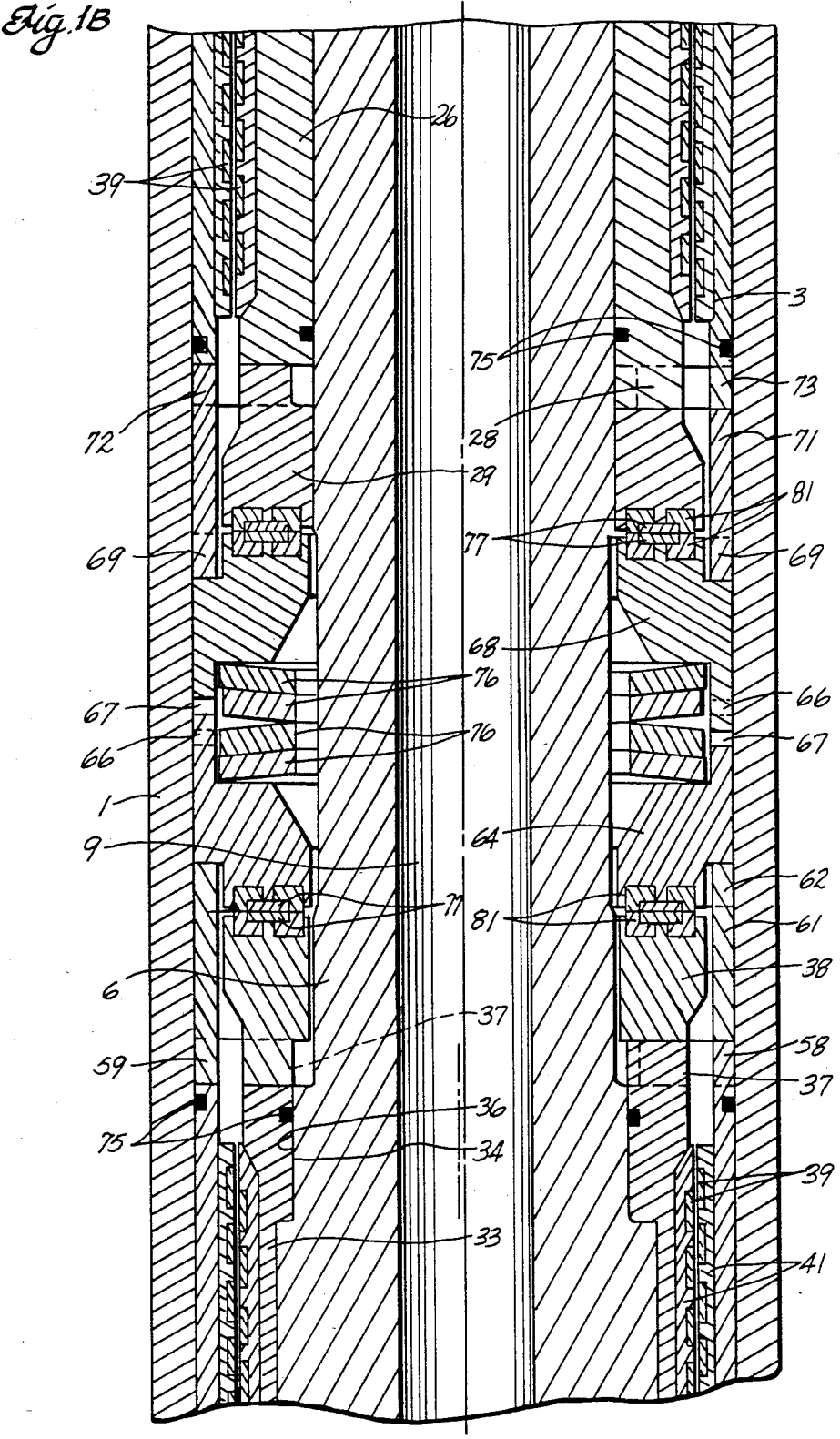

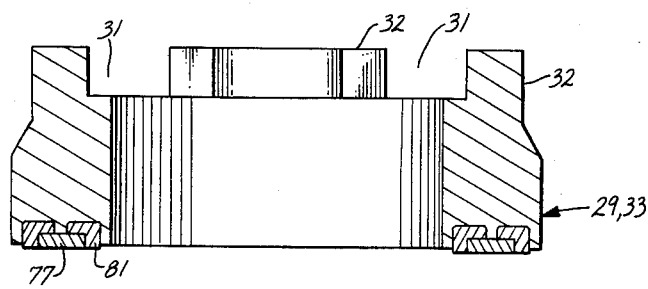
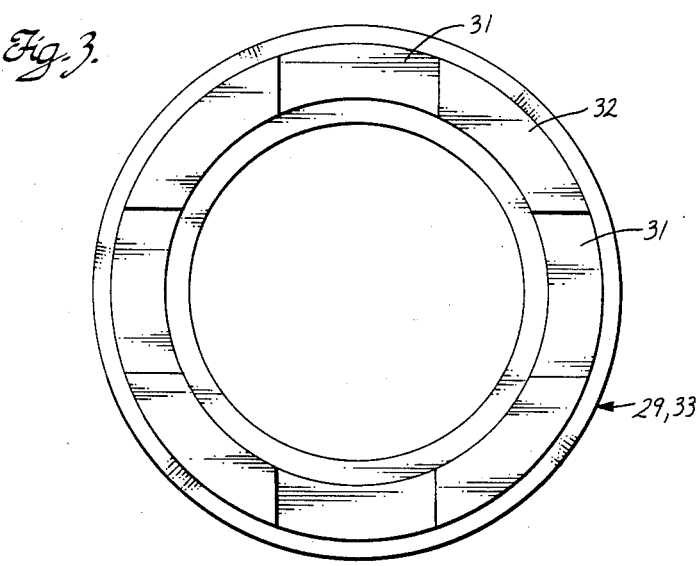
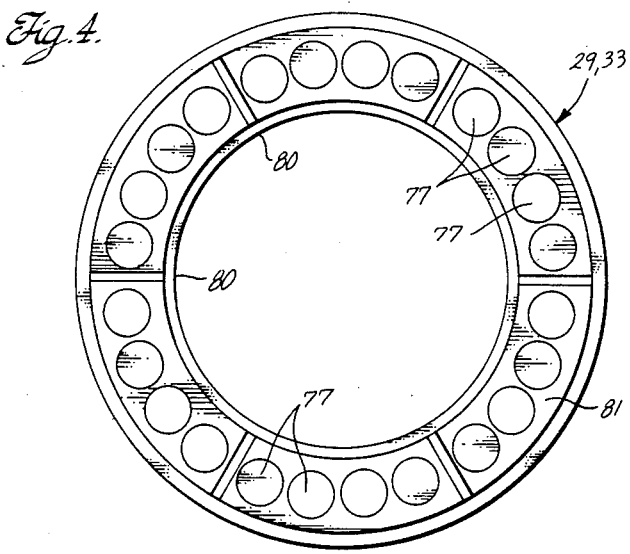

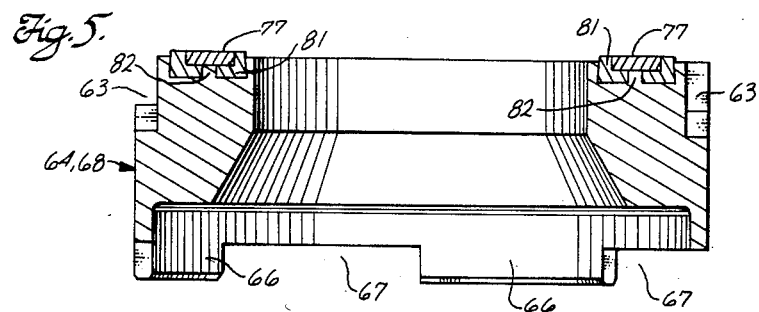
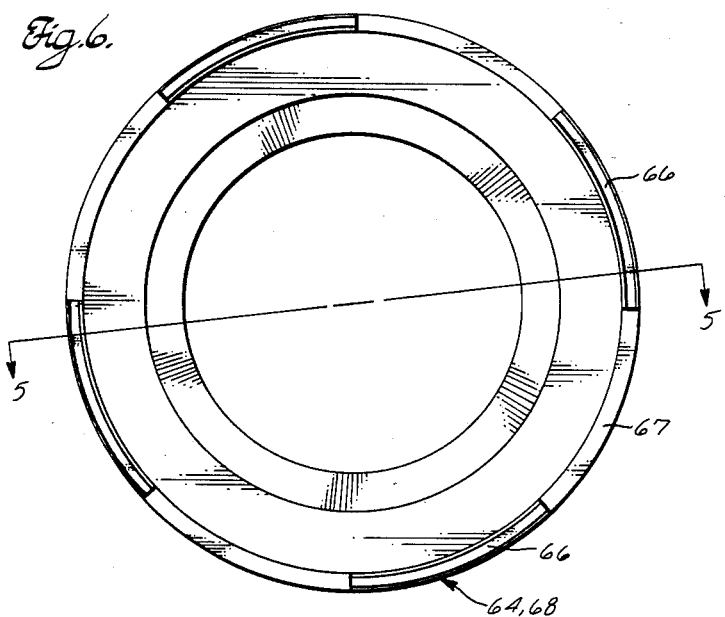
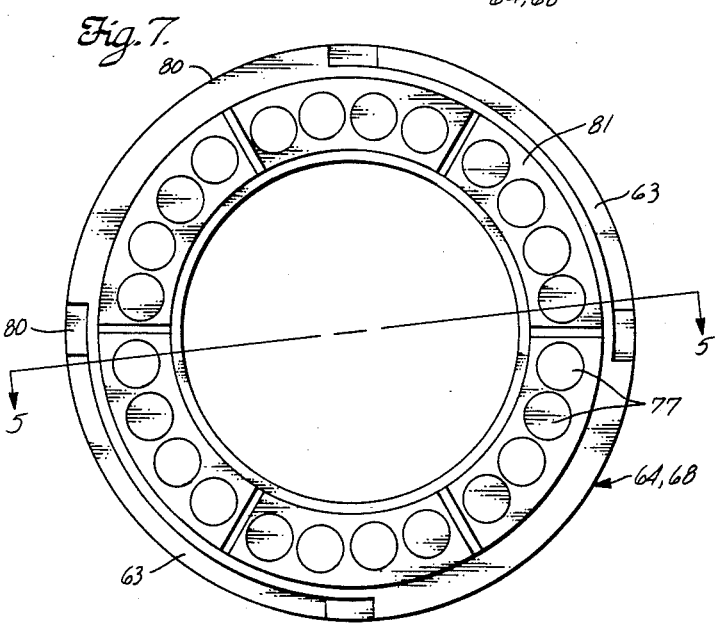

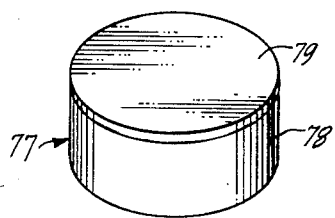
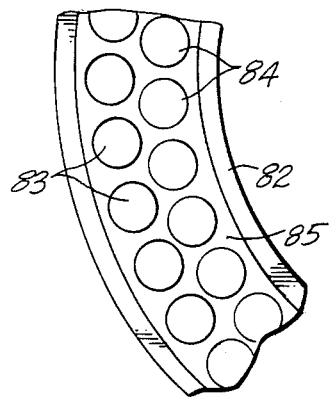
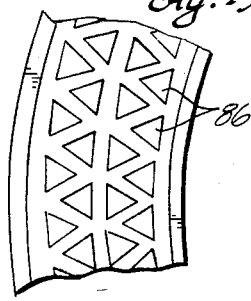
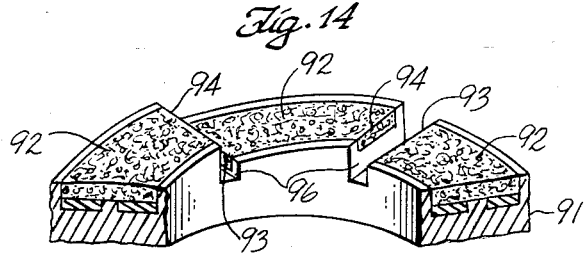
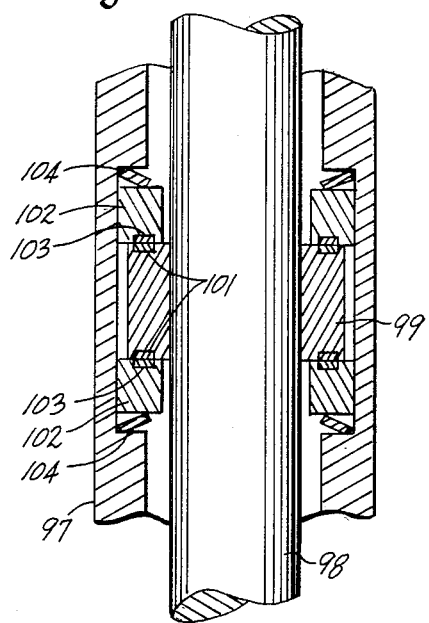

THRUST BEARING ASSEMBLY FOR A DOWNHOLE DRILL MOTOR

FIELD OF THE INVENTION

This invention relates to a bearing assembly for use between a downhole drill motor and a rock bit used for drilling bore holes in the earth for oil and gas wells or the like.

BACKGROUND

Some oil wells or other bore holes in the earth are drilled by rotating a drill pipe at the ground surface with a rock bit on the lower end of the pipe for drilling the earth. In such rotary drilling the entire drill string rotates. Other wells or parts of wells are drilled by lowering a hydraulic motor down the bore hole with a rock bit connected to the motor. Drilling fluid, commonly referred to as mud, is pumped down a pipe connected to the motor. The drilling fluid drives the motor which rotates the rock bit. The mud returns to the ground surface through the annulus surrounding the pipe in the bore hole. In this arrangement it is not necessary to rotate the entire drill string.

Either of two types of downhole hydraulic motors can be used. One known as a turbo drill has a large number of turbine stages driven by the flowing mud. Another type is a progressive cavity positive displacement motor analogous to a Moyno pump driven in reverse by the flowing drilling fluid. Either of such motors is a few inches in diameter and can range up to 30 feet in length. The housing of such a motor remains stationary and a shaft within the motor is rotated.

Between the motor and the bit for drilling there is a bearing assembly. Such an assembly has a fixed casing which is threaded to the casing for the motor and a shaft which is connected to the motor shaft. The bearing assembly includes radial journal bearings between the shaft and housing and thrust bearings for carrying the substantial thrust loads involved in this mode of drilling.

High pressure drilling fluid is applied through the pipe to the motor while the bit is off of the bottom of the hole. This generates a high thrust load tending to push the shaft downhole. This is referred to as an off bottom load. After the bit is rotating, the assembly is lowered so that the bit is in engagement with the bottom of the hole with sufficient pressure to effect drilling. This reverses the direction of thrust in the bearing assembly and is referred to as the on-bottom thrust. Several such thrust reversals can be encountered as drilling is stopped and started each time a length of drill pipe is added to the string or for other reasons. The thrust bearings are subjected to high loads, vibration, and in some cases rather high rotational speeds. Exemplary speeds in a positive displacement motor are in the range of 125 to 500 RPM. Turbo drill speeds can be four times larger and are typically 1000 RPM. The bearing assembly must last hundreds of hours so as to outlast the rock bit.

The off-bottom load to be carried by the thrust bearings can be as much as 30,000 pounds when a positive displacement motor is used. Off-bottom thrust can be as much as 40,000 pounds with rotational speeds as high as 2000 RPM with a turbine motor, although such conditions are preferably avoided. The on-bottom thrust loads at low to intermediate speeds (e. g., 125 to 400 RPM) range from 10,000 to 40,000 pounds. At high speeds (e.g., 1000 RPM) thrust loads can range up to 20,000 pounds or more.

Thrust bearings using balls operating in thrust carrying races have been used for the thrust bearings between a downhole drill motor and a rock bit. A substantial problem with ball bearing type thrust bearings is the ability to sustain high drilling loads for long enough periods of time. The ball bearing thrust bearings presently available are not suitable for carrying thrust of more than 20,000 pounds on a sustained basis, particularly at high speeds. When the assembly must carry very high thrust loads in either of two directions, a rather large number of separate ball bearing stages must be used so that no individual stage is excessively loaded. This results in a bearing assembly that is extraordinarily long. The assembly may need to be sealed to retain lubricant for the bearings and seals are difficult in the downhole conditions. Such assemblies are also costly to manufacture, assemble and adjust to the required precision.

Friction bearings of rubber and/or plastic have been made for turbo drills where one attempts to balance the downhole thrust from the motor with the uphole thrust of the drill bit to minimize thrust load on the bearing assembly. Such balance is difficult to achieve in practice and many stages of thrust bearing can be required to carry the loads under all conditions. Further, such bearing assemblies using organic materials have maximum temperature limitations that restrict their use and they may not be usable with oil base drilling muds. Metal inserts in rubber have also been tried but these are subject to the limitations of the organic materials and further, it is difficult to form a good enough bond between the metal and rubber to withstand temperature cycling or even somewhat elevated temperatures.

It is desirable to provide a high load thrust bearing assembly that is capable of carrying heavier loads for sustained periods than the thrust bearing assemblies presently available. Bearing assemblies operated under the severe conditions of well drilling have operating lifetimes of up to only about 250 hours. It is desirable to provide a thrust bearing system capable of operating over considerably longer time periods. It is also desirable to provide a thrust bearing system that does not require precise adjustment and can accept shock loading and the like without damage to the bearing assembly or the drill motor.

Such a bearing assembly should be usable with oil or water base drilling muds and operate under any temperature conditions that a rock bit can tolerate. The assembly should tolerate the wear encountered during its useful life. It should be operated without need for rotating seals and capable of withstanding numerous thrust reversals. Preferably the assembly is self-aligning and readily built without need for precise adjustments.

BRIEF SUMMARY OF THE INVENTION

There is, therefore, provided in practice of this invention according to a presently preferred embodiment, a bearing assembly for a downhole fluid motor having a stationary housing with a rotatable drive shaft extending through the housing for supporting a drill bit. The drive shaft is supported radially by a radial journal bearing sleeve fixed in the housing and a radial journal bearing sleeve fixed on the drive shaft. Bidirectional thrust is accommodated in the bearing assembly by first and second rotatable thrust bearing rings fixed on the drive shaft and having radially extending thrust faces facing in opposite directions and first and second stationary thrust bearing rings fixed in the housing and having radially extending thrust bearing faces facing in opposite directions for engaging the bearing faces on the rotatable rings. Means are provided for resiliently biasing the two sets of thrust bearing faces toward interengagement. Each thrust bearing ring comprises a metal ring having a bearing member embedded in the metal ring and forming the thrust bearing face. The bearing member has a hardness of at least 8 on the Mohs scale. Preferably the bearing surface is formed by a plurality of tungsten carbide inserts in the metal ring, each of which has a polycrystalline diamond face, arranged in a ring so that the diamond faces collectively form a planar thrust bearing face. Alternatively the bearing member can be formed of a plurality of flat polycrystalline diamond inserts embedded in the ring and collectively forming the bearing face. Preferably, drilling fluid from the downhole motor is circulated through the thrust bearing interfaces for forming a hydrodynamic fluid bearing film in each such interface.

DRAWINGS

These and other features and advantages of the present invention will be appreciated as the same becomes better understood by reference to the following detailed description of presently preferred embodiments when considered in connection with the accompanyings drawings wherein:

FIG. 1B is a longitudinal cross section of a middle portion of the bearing assembly;

FIG. 2 is a longitudinal cross section of a stationary thrust bearing ring of the assembly;

FIG. 3 is a view of the back face of the stationary thrust bearing ring of FIG. 2;

FIG. 4 is a view of the bearing face of the stationary thrust bearing ring of FIG. 2;

FIG. 5 is a longitudinal cross section of a rotating thrust bearing ring of the bearing assembly;

FIG. 6 is a view of the back face of the rotating thrust bearing ring of FIG. 5;

FIG. 7 is a view of the bearing face of the rotating thrust bearing ring of FIG. 5;

FIG. 11 is a perspective view of an exemplary insert for the bearing face of such a bearing ring;

FIG. 12 is a view of the bearing face of another embodiment of bearing ring;

FIG. 13 is a view of the bearing face of another embodiment of bearing ring;

FIG. 14 is a fragmentary perspective view of another embodiment of thrust bearing ring; and FIG. 15 is a schematic longitudinal cross section of the thrust bearing portion of a bearing assembly constructed according to principles of this invention.

DETAILED DESCRIPTION

Figure 1A:
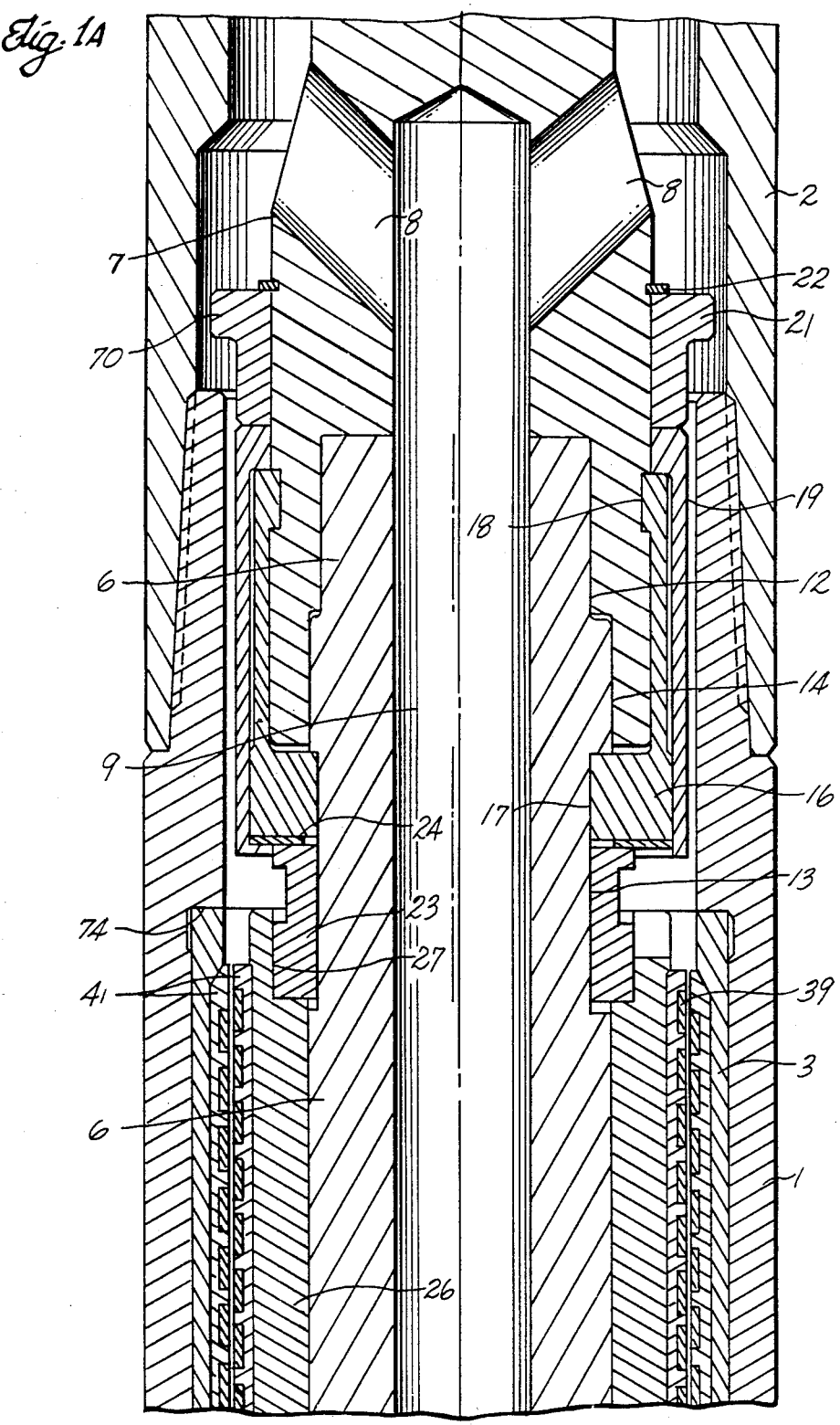
FIG. 1A illustrates in longitudinal cross section an upper portion of a bearing assembly constructed according to principles of this invention.

The thrust bearing assembly has a fixed housing 1 extending substantially the entire length of the assembly. A connector sub 2 is threaded onto the upper end of the housing for connection of the assembly to the housing of a downhole drill motor (not shown) by conventional threads or the like. An upper stationary journal bearing sleeve 3 is mounted in the housing 1 near its upper end. A lower stationary journal bearing sleeve 4 is mounted in the housing near its lower end.

A rotatable drive shaft 6 extends through the housing along its axis. A connector cap 7 is connected to the upper end of the drive shaft for connection in turn to the drive shaft of the downhole fluid motor with which the bearing assembly is used. The connector cap has holes 8 for conveying drilling fluid from the outside of the cap to a passage 9 extending along the length of the drive shaft. This permits flow of drilling fluid through the bearing assembly to a drill bit connected to the lower end of the drive shaft. The lower end of the drive shaft has an enlargement 11 having a conventional threaded box (not shown) for connection of a drill bit to the bearing assembly.

An eccentric connection is provided between the upper end of the drive shaft 6 and the connector cap 7 as illustrated in FIG. 1A. An extension 12 at the upper end of the drive shaft has a circular cross section with its center line eccentric relative to the axis of the shaft. The end extension 12 is received in an eccentric bore near the lower end of the connector cap 7. An eccentric undercut 13 is formed below an enlargement 14 on the shaft just below the end extension. The enlargement 14 is coaxial with the drive shaft. A split locking ring 16 has a lower internal lip 17 extending into the undercut and having an eccentric bore engaging the eccentric undercut. The exterior of the split locking ring 16 is cylindrical and coaxial with the drive shaft axis. An internal shoulder 18 at the upper end of the split locking ring fits into a groove on the outside of the connector cap 7. The split locking ring is retained in this position by a sleeve-like ring retainer 19 surrounding the split locking ring. The retainer is surmounted by a spacer 21 and the connector cap subassembly is secured by a retaining snap ring 22 on the outside of the cap.

A second split ring 23 is positioned in the eccentric undercut 13 on the shaft. A suitable thickness shim 24 is positioned between the split ring 23 and the split locking ring 16 as further described hereinafter. An upper rotatable journal bearing sleeve 26 is fitted onto the drive shaft within the outer stationary radial bearing sleeve 3 in the housing. An eccentric bore 27 at the upper end of the bearing sleeve fits around the lower end of the split ring 23 thereby assuring that the bearing sleeve rotates with the drive shaft.

The lower end of the rotatable bearing sleeve is crenellated with four extensions 28 fitting into four corresponding slots in the upper end of a rotatable thrust bearing ring 29. Such a thrust bearing ring is illustrated in greater detail in FIGS. 2, 3 and 4. The extensions 28 on the rotatable journal bearing sleeve fit into more or less radial slots 31 in the upper face of the thrust bearing ring. Extensions 32 between the slots 31 engage edges of the extensions 28 on the journal bearing sleeve and assure that these parts rotate together with the drive shaft.

A lower rotatable journal bearing sleeve 33 is also mounted coaxially with the drive shaft so as to be within the lower stationary radial bearing sleeve 4 in the housing. The bore through the rotatable journal bearing sleeve 33 includes an eccentric portion 34 near the upper end which engages a short eccentric surface 36 on the drive shaft to assure that the bearing sleeve rotates with the shaft. The upper end of the lower rotatable radial bearing sleeve 33 has four extensions 37 which fit into slots 31 on a lower rotatable thrust bearing ring 38. The lower thrust bearing ring is substantially identical to the upper thrust bearing ring 29 illustrated in FIGS. 2, 3 and 4.

Each of the radial bearing sleeves 3, 4, 26 and 33 comprises a steel sleeve supporting short cylindrical bearing inserts 39 of tungsten carbide secured in place by a matrix 41 of tungsten carbide particles in nickel silver or the like. Only a portion of the tungsten carbide inserts 39 are illustrated in the drawings. These bearing inserts are on the outside of the rotatable journal bearing sleeves 26 and 33 and on the inside of the stationary journal bearing sleeves 3 and 4. These journal bearings support the radial loads between the stationary housing and rotating shaft. Two pairs of such bearings are spaced well apart in the bearing assembly for taking substantial bending moments which may be encountered in directional drilling, for example.

Figure 1C:
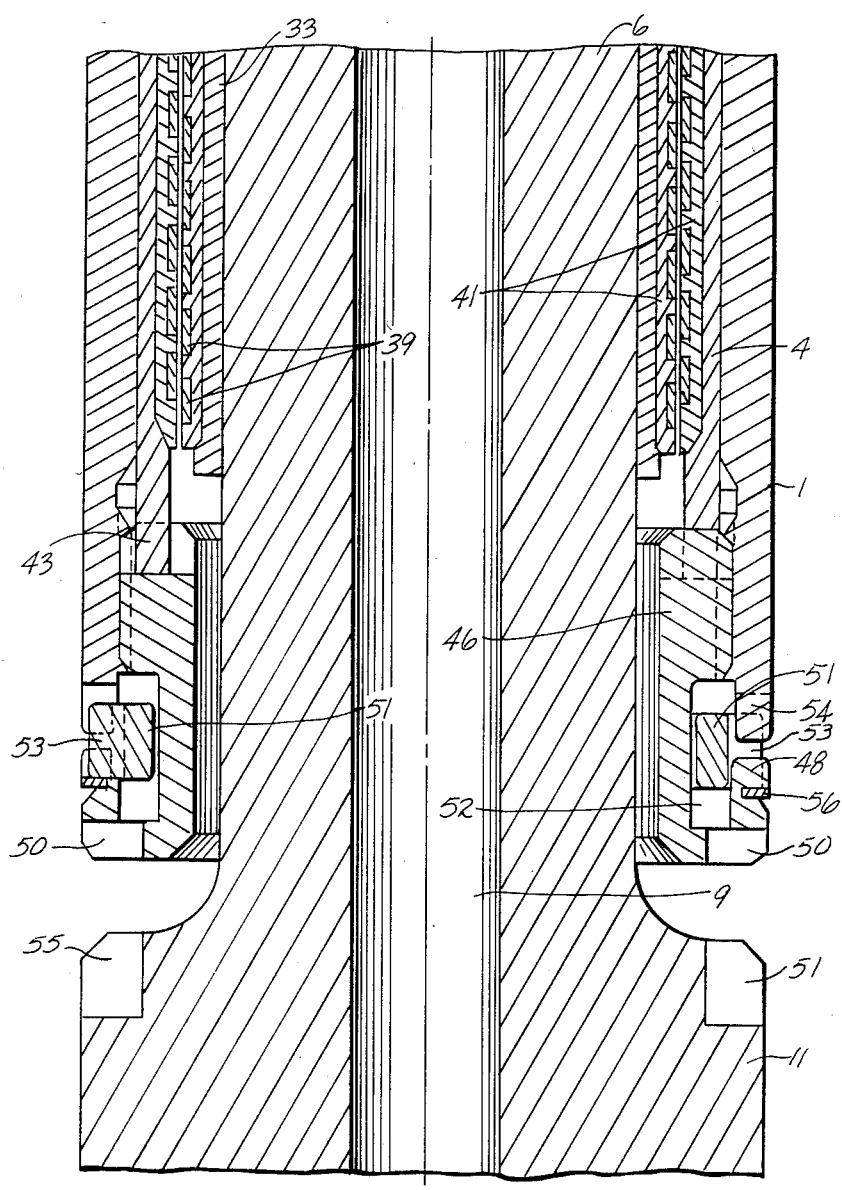
FIG. 1C is a longitudinal cross section of a lower portion of the thrust bearing assembly, FIGS. 1A, 1B, and 1C collectively forming a longitudinal cross section of most of the length of the thrust bearing assembly, the conventional end connections being deleted.
Figure 8:
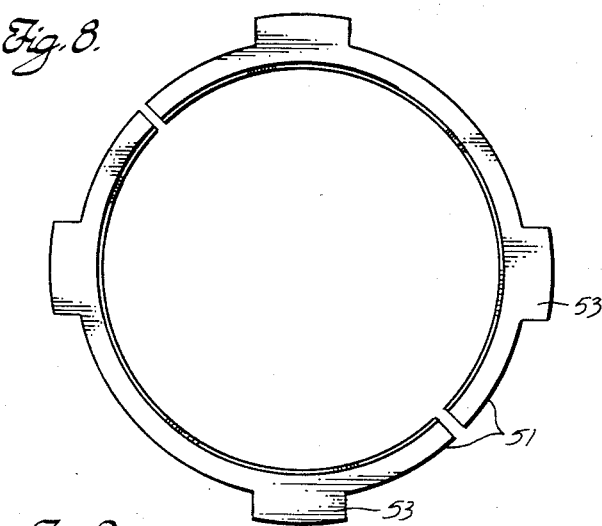
FIG. 8 is a view of one face of a split locking ring used in assembling the bearing assembly.
Figure 9:
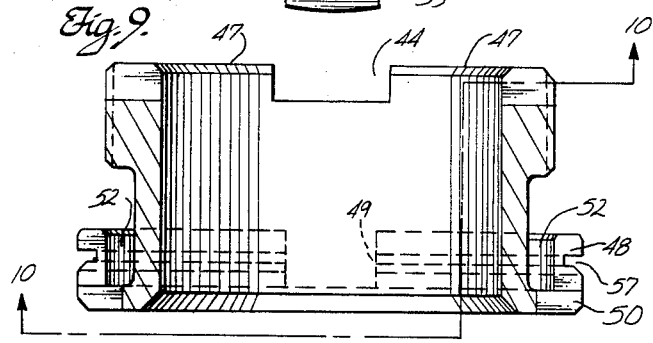
FIG. 9 is a longitudinal cross section of a locking nut used in assembling the bearing assembly.
Figure 10:
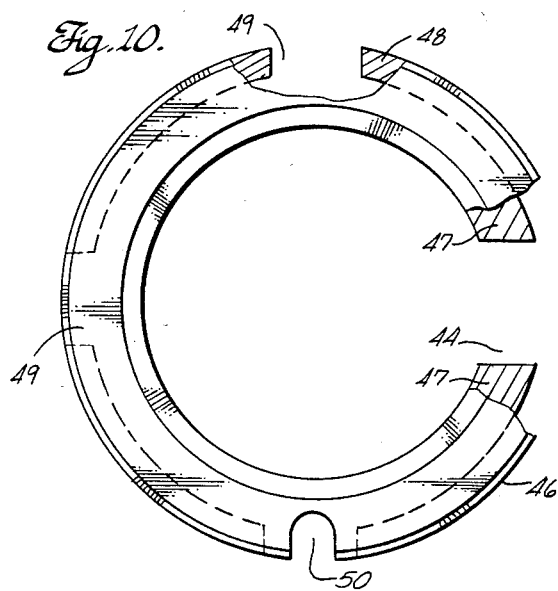
FIG. 10 is a view of one face of the locking nut illustrated in FIG. 9.

The lower stationary radial bearing sleeve 4 is prevented from rotating relative to the stationary housing by a locking arrangement at the bottom of the housing. This locking arrangement is illustrated in FIG. 1C and parts used in the assembly are illustrated in FIGS. 8, 9 and 10. The lower end of the lower radial bearing sleeve is crenellated with four extensions 43 fitting into four more or less radial slots 44 in the upper end of a lock nut 46. The extensions 43 engage extensions 47 between the slots 44 in the lock nut 46 (FIGS. 9 and 10). The upper end portion of the lock nut is externally threaded for engagement with female threads within the lower end of the housing 1.

Near its lower end the lock nut has an upstanding annular rim 48 which is subdivided by four more or less radial slots 49 (FIGS. 9 and 10). A split locking ring 51 has a length corresponding to the depth of the recessed annulus 52 between the upstanding rim 48 and the balance of the lock nut. The split locking ring includes four radial projections 53 which fit into the slots 49 in the upstanding rim 48 of the nut.

When the bearing assembly is being assembled the split locking ring remains in the annulus 52 as the lock nut is threaded into the lower end of the housing to its desired position. The split locking ring is then lifted so that the projections 53 engage crenellations 54 on the lower end of the housing. The split locking ring is maintained in its raised position by a retaining ring 56 which snaps into an external groove 57 on the outside of the rim of the lock nut. In this position the projections on the split locking ring engage both the upstanding rim 48 on the lock nut and the crenellations 54 on the lower end of the housing, thereby preventing relative rotation between the lock nut and housing. The crenellated connection between the upper end of the lock nut and the extensions 43 on the lower end of the lower radial bearing sleeve 4 thereby assures that the stationary bearing sleeve does not rotate in the housing.

A pair of diametrically opposite slots 50 at the bottom of the lock nut can be aligned with similar slots 55 in the top of the shaft enlargement 11. Dowel pins (not shown) can be temporarily placed in the aligned slots and the shaft can be rotated relative to the housing to serve as a "wrench" for manipulating the lock nut. When the lock nut is fixed in place, such dowels can be used to temporarily prevent rotation between the shaft and housing.

The upper end of the lower stationary bearing sleeve 4 is also crenellated with projections 58 engaging corresponding projections 59 on a sleeve spacer ring 61. A pair of extensions 62 on the upper end of the sleeve spacer ring 61 extend a little more than 90% around opposite sides of the ring and fit into corresponding slots 63 (FIGS. 5 and 6) in the lower end of a lower stationary thrust bearing ring 64.

The upper end of the lower stationary thrust bearing ring has four projections 66 that fit into corresponding slots 67 in the lower end of an upper stationary thrust bearing ring 68. The upper and lower thrust bearing rings 64 and 68 are identical and are illustrated in greater detail in FIGS. 5, 6 and 7. The projections 66 on the lower end of the upper thrust bearing ring 68 fit into the slots 67 in the upper end of the lower stationary thrust bearing ring 64.

The slots 63 (FIGS. 5 and 6) in the top of the upper thrust bearing ring 68 accommodate a pair of extensions 69 on the lower end of a sleeve spacer ring 71. The sleeve spacer ring 71 is identical to the lower sleeve spacer ring 61. Projections 72 on the upper end of the upper sleeve spacer ring 71 engage projections 73 on the lower end of the upper radial bearing sleeve 3 thereby assuring that there is no relative rotation between the spacer and sleeve.

Recapitulating, the stationary bearing members are prevented from rotating relative to the housing by way of interlocking projections on the lower end of the housing 1 and split locking ring 51, the split locking ring and the lock nut 46, the upper end of the lock nut and the lower end of the lower journal bearing sleeve 4, the upper end of the lower journal bearing sleeve and the lower sleeve spacer ring 61, the upper end of the lower sleeve spacer ring and the lower stationary thrust bearing ring 64, the upper end of the lower thrust bearing ring and the lower end of the upper thrust bearing ring 68, the upper end of the upper thrust bearing ring and the lower end of the upper sleeve spacer ring 71, and the upper end of the upper sleeve spacer ring and the lower end of the upper journal bearing sleeve 3.

A set of four Belleville or spring washers 76 are positioned between the upper and lower stationary thrust bearing rings 68 and 64. The Belleville washers resiliently bias the stationary thrust bearing rings apart from each other and towards the rotatable thrust bearing rings 29 and 38 respectively. The springs are an important feature of the bearing assembly.

The springs serve to bias the interengaging thrust bearing faces on the two pairs of bearing rings toward engagement. This tends to minimize shock loading and also permits the bearing assembly to be constructed without extraordinarily tight tolerances. Under some conditions one of the thrust bearing interfaces can open up; that is, the stationary and rotatable bearing rings can separate slightly. When the direction of thrust reverses the springs tend to cushion the closing of the gap, thereby minimizing shock loading that could damage the thrust bearing faces. The springs make the thrust bearings self-aligning regardless of manufacturing variations or wear. The springs accommodate wear of the thrust hearings as the bearing surfaces wear away during use.

When drilling fluid pressure is applied to a downhole fluid motor connected to the bearing assembly, the off-bottom of downhole thrust is carried through the assembly as follows: from the connector cap 7 to the end of the drive shaft 6, from the lower end of the enlargement 14 on the drive shaft to the top of the lip 17 on the split locking ring 16, from the split locking ring to the shim 24, from the shim 24 to the split ring 23 on the eccentric undercut 13, from the lower end of the split ring 23 to the upper rotatable radial journal bearing sleeve 26, from the lower end of the rotatable journal bearing sleeve to the upper rotatable thrust bearing ring 29, through the upper thrust bearing interface to the upper stationary thrust bearing ring 68, from the upper thrust bearing ring to the set of Belleville springs 76, from the Belleville springs to the lower stationary thrust bearing ring 64, from the lower thrust bearing ring to the lower sleeve spacer 61, from the lower sleeve spacer to the lower stationary radial journal bearing sleeve 4 and from the lower radial journal bearing sleeve to the lock nut 46 which is threaded into the bottom of the housing.

When the assembly is lowered so that the drill bit is on the bottom of the hole, the on-bottom or up-hole load on the drive shaft is transmitted as follows: from the drive shaft to the shoulder at the bottom of the eccentric bore 36 in the lower rotatable radial journal bearing sleeve 33, from the lower radial journal bearing sleeve to the lower rotatable thrust bearing ring 38, through the lower thrust bearing interface between the lower rotatable thrust bearing ring and the lower stationary thrust bearing ring 64, from the lower thrust bearing ring to the set of Belleville rings 76, from the Belleville springs to the upper stationary thrust bearing ring 68, from the upper thrust bearing ring to the upper sleeve spacer 71, from the upper sleeve spacer to the upper stationary radial journal bearing sleeve 3, and from the upper radial journal bearing sleeve to a shoulder 74 in the housing near its upper end.

Thus, both the off-bottom and on-bottom thrust loads are transmitted through the Belleville springs 76. The interengaging projections 66 and slot 67 (FIGS. 5 and 6) in the back faces of the stationary thrust bearing rings have a sufficient axial length that there is no transmission of thrust, even if the Belleville springs were completely deflected to resemble flat washers. Thus, the connection between the stationary thrust bearing rings can convey only torque, and thrust loads are transmitted through the Belleville springs.

When the springs deflect as thrust is applied, the drive shaft tends to move axially relative to the housing. When the bit is on the bottom of the hole the lower pair of bearing rings 38 and 64 are kept in tight engagement by the thrust. Meanwhile, pressure of drilling fluid from the motor is applied against the upper end of the upper rotatable radial journal bearing sleeve 26 which, in turn, presses against the upper rotatable bearing ring 28. This load can help keep the upper thrust bearing interface in engagement although a gap can open up in the thrust bearing interface. When the bit is off bottom and thrust is applied on the drive shaft by the drill motor, a gap can form in the thrust bearing interface between the lower thrust bearing rings 38 and 64. If desired compression springs can be provided between the lower rotatable thrust bearing ring 38 and the lower rotatable radial journal bearing sleeve 33 and between the upper rotatable radial journal bearing sleeve 26 and the upper journal bearing ring 20 for assuring that gaps form between these parts instead of at the thrust bearing interfaces.

When the bearing assembly is assembled, the Belleville springs are compressed only slightly if at all. When there is a light preload on the springs, both thrust bearing interfaces are kept closed when there is no thrust load on the assembly. The larger the preload, the larger the thrust load that is carried by the assembly before a gap opens in the unloaded bearing interface. This avoids complete flattening of the Belleville springs at maximum thrust load.

The various parts of the bearing assembly are assembled on the drive shaft outside of the housing. The parts are added sequentially from the bottom toward the top. The stationary thrust bearing rings and Belleville springs are assembled on the shaft even through they do not rotate therewith. The stationary radial journal bearing sleeves can be assembled on the shaft or into the housing although the former is preferred to ease alignment problems. After the split ring 23 is installed, the gap between the split ring and the split locking ring 16 can be observed for determining the thickness of shim to be inserted. Use of the shim relaxes the tolerances needed in machining the parts of the assembly since accumulated tolerances are compensated for with the shim. Use of a shim also accommodates wear of parts as the assembly is reused with replacement bearing rings.

The shaft with the parts assembled thereon (other than the spacer 21 at the top) is then inserted upwardly through the housing. The lock nut 46 is assembled on the housing as hereinabove described for retaining the assembly in place. The lock nut is threaded into the housing until tight and then backed off slightly before locking in place with the split locking ring 51. The spacer 21 and snap ring 22 are then added at the upper end of the shaft. The spacer 21 includes a flange 70 at its upper end. The flange has a larger diameter than the inside diameter of the upper end of the housing, thereby providing a safety stop to prevent the drive shaft from being driven out of the housing in response to downhole thrust from the drill motor when other parts have worn or failed.

When the bearing assembly is in use, pressurized drilling fluid is in the annulus between the connector sub 2 and the connector cap 7. Most of the drilling fluid flows through the holes 8 in the connector cap and into the passage 9 through the drive shaft 6. However some of the drilling fluid (in the order of one percent) flows through the bearing assembly for cooling the journal and thrust bearings and providing a fluid film in the bearings.

Drilling fluid flows downwardly through the bearing assembly sequentially as follows: through the annulus between the housing 1 and the ring retainer sleeve 19, through the bearing interface between the upper rotating and stationary radial journal bearing sleeves 26 and 3, radially inwardly through the interface between the upper rotating and stationary thrust bearing rings 29 and 68, through the annulus between the Belleville springs 76 and the drive shaft 6, radially outwardly through the interface between the lower stationary thrust bearing ring 64 and lower rotatable thrust bearing ring 38, through the interface between the lower stationary radial journal bearing sleeve 4 and the lower rotatable radial bearing sleeve 33, and through the annulus between the lock nut 46 and the drive shaft. O-ring seals 75 or a viscous sealant prevents drilling fluid from washing out behind the journal bearing sleeves.

Such drilling fluid in the bearing interfaces is typically oil or water containing particles to form a mud which is highly abrasive. It is therefore significant that the bearing interfaces in the bearing assembly contain inserts that have a hardness of at least 8 on the Mohs scale. This makes such inserts sufficiently resistant to abrasive action that the operating lifetime of the bearing assembly can be substantially enhanced as compared with prior ball bearing assemblies.

When the shaft in the bearing assembly is first rotated there may be solid to solid contact between thrust bearing faces resulting in high friction forces. It is therefore quite desirable to provide bearing face inserts having a Mohs scale hardness of at least 8 to prevent premature failure. It is not uncommon for downhole drill motors to be stopped and restarted many times during the useful life of a bearing assembly. For example, the motor is stopped as each length of pipe is added to the drill string as drilling progresses. Once the shaft is rotating, fluid is available for the bearings and a hydrodynamic fluid film avoids solid to solid contact between opposing thrust bearing faces.

Exemplary materials suitable for inserts in the bearing interfaces include tungsten carbide, silicon carbide, aluminum oxide and other hard metal carbides and oxides. It is particularly preferred that the thrust bearing interfaces be formed with polycrystalline diamond inserts.

Exemplary bearing faces for the thrust bearing rings are illustrated in FIGS. 4 through 7. Each bearing ring has a substantially flat bearing face containing a plurality of circular inserts 77 arranged in a circle around the ring. An exemplary insert as illustrated in FIG. 11 comprises a short cylinder 78 of tungsten carbide having a layer of polycrystalline diamond 79 secured to one end face. The polycrystalline diamond layer forms the bearing face of the insert. Such inserts are commercially available from General Electric Company under their trademark STRATAPAX. The polycrystalline diamond face is formed of synthetic or man made diamonds. Natural diamonds are ordinarily single crystals and are not presently economical for use in the thrust bearing assembly. Composites of natural diamonds could, however, be used.

As used herein, "tungsten carbide" refers to either such carbide, or more commonly to cemented tungsten carbide. The latter comprises small particles of tungsten carbide cemented together with a metal such as cobalt. The metal phase may comprise up to 15 percent or more of the composition.

Such inserts are mounted in the respective bearing ring by a matrix 81 formed of a mixture of tungsten carbide particles and nickel silver or the like. The matrix is in a groove in one face of such a bearing ring. A raised circular lip 82 is provided in the bottom of the groove as a means for positioning the inserts 77 so that the diamond faces of the inserts are in a common plane.

The circle of inserts in opposing faces of a pair of bearing rings are arranged so that during relative rotation of the rings a large percentage of the total area of inserts on the two rings are in engagement. This assures continuous interengagement of the opposed abrasion-resistant diamond bearing faces. Preferably the inserts are placed sufficiently close together in the rings that the minimum area of contact between the interfaces in the two rings is not significantly less than about 50% of the area of interengagement when the inserts on the two rings are in maximum engagement. This assures that the bearing pressures on the inserts do not become extraordinarily high. In the exemplary embodiment the same number of inserts are used in each of the bearing rings. If desired the number of inserts in each ring can differ for minimizing the difference between maximum and minimum loading and avoiding periodic changes in loading.

In the arrangement illustrated in FIGS. 4 and 7, a plurality of radial grooves 80 are provided across the bearing face of each thrust bearing ring. In an exemplary embodiment such grooves can be about ⅛ inch wide and ⅛ inch deep. The radial grooves provide a path for fluid flow radially through the thrust bearing. Preferably the grooves are sufficiently deep that grooves remain across the bearing faces after the maximum erosion of the bearing faces due to wear as the bearing assembly is used. For example, if the maximum wear of each bearing face is anticipated to be 1/10 inch, grooves ⅛ inch deep can be provided in each bearing face.

When the shaft in the bearing assembly is first rotated, there may be solid to solid contact between the thrust bearing faces of the two rings. As soon as rotation commences, the fluid in the grooves is distributed to the opposing bearing faces, resulting in formation of a hydrodynamic fluid film in the bearing, thereby avoiding solid to solid contact between opposing thrust bearing faces. If desired, the number and/or spacing of grooves in the two bearing rings can differ so that the two bearing faces are not identical.

In another embodiment the grooves across the thrust bearing faces do not extend exactly radially but can be skewed in the direction of rotation for augmenting flow of drilling fluid through the bearing interface. Such an arrangement can be particularly useful where the direction of fluid flow through the thrust bearing face is generally radially inward. The "pumping" action of the nonradial grooves can be used to offset the resistance to fluid flow due to centrifugal forces.

The quantity of drilling fluid circulated through the bearing assembly for maintaining a fluid film in the bearings is about 10 to 20 times the minimum quantity believed necessary for proper operation of the bearing assembly, thereby assuring no failures due to starvation for such fluid. The fluid flow passages through the assembly have a relatively large cross section for fluid flow relative to the thrust bearing interfaces. For example, the clearance between the inner and outer journal bearing sleeves 26 and 3, 33 and 4, can be ten thousandths of an inch or more so as to not unduly restrict flow. Thus, the limitation on flow through the bearing assembly is determined by the thrust bearings. This assures that the thrust bearings are not starved for a fluid film.

FIG. 12 illustrates in a fragmentary view the face of another embodiment of thrust bearing ring 82 containing circular tungsten carbide inserts with polycrystalline diamond faces as hereinabove described. In this embodiment a plurality of circular inserts 83 are arranged in an outer circular row around the face of the disk. Another plurality of inserts 84 are arranged in an inner circular row on the face of the bearing ring. The inserts are held in place in the ring by a tungsten carbide-nickel silver matrix 85. The inserts 83 in the outer row are staggered from the inserts 84 in the inner row for more fully tesselating the bearing face of the ring. Such an arrangement minimizes changes in the surface loading of the inserts as the bearing rings rotate relative to each other.

FIG. 13 illustrates in fragmentary view the face of another embodiment of thrust bearing ring suitable for use in the thrust bearing assembly. In this embodiment the abrasion-resistant inserts 86 embedded in the bearing ring are each in the form of equilateral triangles. Each insert is formed of polycrystalline diamond. Such inserts are available from General Electric Company with each insert having a thickness of about 0.08 inch. Each side of the equilateral triangle is about ⅛ inch long. These inserts are arranged in an interlaced pattern with close spacing for maximizing the area tessellated by the inserts.

Other arrangements of inserts in the faces of the bearing rings will be apparent to one skilled in the art. Thus, for example, each insert can be in the form of a short arcuate section with curved inner and outer edges and radial side edges so that collectively the inserts form a nearly continuous face around the thrust bearing ring. Alternatively a continuous ring of hard material can be inserted in the bearing face. Such an arrangement can be particularly suitable for tungsten carbide or other carbides or oxides. Such a ring can be provided with grooves between the segments to form a substantially continuous ring of abrasion-resistant material inserted in the steel substrate of the bearing.

In the preferred embodiment the inserts in both the stationary and rotating bearing rings have bearing faces of polycrystalline diamond. If desired the inserts in opposing bearing rings can be of different abrasion resistant materials. For example, one ring can have inserts with faces of polycrystalline diamond while the other ring engaged therewith has a continous or nearly continuous ring of tungsten carbide, silicon carbide, aluminum oxide or other material with a hardness of at least 8 on the Mohs scale.

FIG. 14 illustrates still another embodiment of thrust bearing ring for the bearing assembly. FIG. 14 is a semi-schematic fragmentary perspective view somewhat exaggerated for clarity of illustration. The steel ring 91 in this embodiment has a plurality of abrasion resistant inserts 92 in the bearing face. Each insert is in the form of an annular arcuate segment with curved inside and outside circumferential edges plus straight radially extending edges. The leading edge 93 of each insert is spaced apart from the trailing edge 94 of the preceding insert by a radial groove 96. Each insert is tilted slightly so that its leading edge is lower than its trailing edge. When such a bearing ring is run opposite a bearing ring with a flat face, each insert operates as a hydrodynamic bearing thereby providing a high resistance to thrust without surface to surface contact between the bearing rings. Such a hydrodynamic bearing will form a fluid film very quickly at the start of rotation thereby minimizing wear due to solid to solid rubbing.

As indicated above, the drawing in FIG. 14 is exaggerated for purposes of illustration. The tilt of the inserts between the leading and trailing edges is quite small ranging from less than one degree to only a few degrees.

FIG. 15 illustrates schematically in longitudinal cross section another embodiment of thrust bearing assembly. This embodiment is presented schematically to illustrate principles of this invention and construction details of assembly are omitted.

In this embodiment the thrust bearing assembly is in a stationary housing 97 in which a drive shaft 98 is mounted for rotation. A rotatable thrust bearing ring 99 is connected to the shaft. The thrust bearing ring on the shaft is bidirectional, that is, it accommodates up-hole or down-hole thrust. The ring therefore has inserts 101 of abrasion-resistant material in both its upper and lower faces. Such inserts can, for example, be substantially continuous tungsten carbide rings or other types of inserts as hereinabove described.

A pair of stationary thrust bearing rings 102 are connected to the housing 97. Each of the stationary thrust bearing rings has abrasion-resistant inserts 103 on the thrust bearing face for opposition to the inserts 101 on the thrust bearing faces of the rotatable thrust bearing ring 99 on the drive shaft. Each of the stationary thrust bearing rings is biased toward the rotatable thrust bearing ring by a Belleville spring 104 or assembly of Belleville springs. Thus, either up-hole or down-hole thrust is transmitted from the shaft to the housing by way of a Belleville spring. It will be noted that when one of the Belleville springs is compressed, the compression of the other Belleville spring is relaxed. Multiple Belleville springs can be assembled in a known manner to provide the desired magnitude of deflection and force.

Many other modifications and variations will be apparent to those skilled in the art. For example, in an embodiment as illustrated in FIG. 15 the rotatable thrust bearing faces can be biased toward the stationary thrust bearing faces in a manner similar to the embodiment illustrated in FIG. 1. As another example, a dry film lubricant can be applied on the bearing faces for brief use until a hydrodynamic fluid bearing film is formed between the bearing faces. Many other arrangements can be provided for connecting the thrust bearing rings to the shaft and housing. It is therefore to be understood that within the scope of the appended claims the invention may be practiced otherwise than as specifically described.

What is claimed is:

1. A thrust bearing assembly for a downhole fluid motor comprising:
   a stationary housing;
   a rotatable shaft extending through the housing;
   a first pair of opposed annular friction thrust bearing faces comprising a first stationary thrust bearing face connected to the housing and a first rotatable thrust bearing face connected to the shaft and in face-to-face engagement with the first stationary thrust bearing face;
   means for transmitting a thrust load in a first direction from the shaft to the first rotatable thrust bearing face and from the first stationary thrust bearing face to the housing;
   a second pair of opposed annular friction thrust bearing faces comprising a second stationary thrust bearing face connected to the housing and a second rotatable thrust bearing face connected to the shaft in face-to-face engagement with the second stationary thrust bearing face;
   means for transmitting a thrust load in a second direction opposite to the first direction from the shaft to the second rotatable thrust bearing face and from the second stationary thrust bearing face to the housing; and wherein
   both means for transmitting comprise spring means between the first and second stationary thrust bearing face for biasing the stationary thrust bearing faces toward the respective rotatable bearings.

2. A thrust bearing assembly for a downhole fluid motor comprising:
   a stationary housing;

a rotatable shaft extending through the housing;

a first pair of opposed thrust bearing faces comprising a first stationary thrust bearing face connected to the housing and a first rotatable thrust bearing face connected to the shaft;

means for transmitting a thrust load in a first direction from the shaft to the first rotatable thrust bearing face and from the first stationary thrust bearing face to the housing;

a second pair of opposed thrust bearing faces comprising a second stationary thrust bearing face connected to the housing and a second rotatable thrust bearing face connected to the shaft;

means for transmitting a thrust load in a second direction opposite to the first direction from the shaft to the second rotatable thrust bearing face and from the second stationary thrust bearing face to the housing; and wherein both means for transmitting comprise spring means for resiliently transmitting thrust between the shaft, bearing faces and housing, the stationary thrust bearing faces are between the rotatable thrust bearing faces, and the spring means resiliently biases the stationary thrust bearing faces apart from each other.

3. A thrust bearing assembly as recited in claim 2 comprising means for transmitting only torque between the first and second stationary thrust bearing faces and wherein the spring means comprises at least one Belleville spring between the stationary thrust bearing surfaces.

4. A thrust bearing assembly as recited in claim 1 wherein each thrust bearing face comprises a plurality of planar polycrystalline diamond faces.

5. A thrust bearing assembly as recited in claim 1 further comprising means for conveying drilling fluid from such a downhole fluid motor through the interfaces between the opposed thrust bearing faces for forming hydrodynamic fluid bearing films in said interfaces.

6. A thrust bearing assembly as recited in claim 1 wherein the spring means comprises:

a first spring for resiliently biasing the first thrust bearing faces together and a second spring for resiliently biasing the second thrust bearing faces together.

7. A thrust bearing assembly for a downhole fluid motor comprising:

a stationary housing;

a rotatable shaft extending through the housing;

a first pair of opposed thrust bearing faces comprising a first stationary thrust bearing face connected to the housing and a first rotatable thrust bearing face connected to the shaft;

means for transmitting a thrust load in a first direction from the shaft to the first rotatable thrust bearing face and from the first stationary thrust bearing face to the housing;

a second pair of opposed thrust bearing faces comprising a second stationary thrust bearing face connected to the housing and a second rotatable thrust bearing face connected to the shaft;

means for transmitting a thrust load in a second direction opposite to the first direction from the shaft to the second rotatable thrust bearing face and from the second stationary thrust bearing face to the housing;

spring means for resiliently biasing both pairs of thrust bearing faces toward engagement; and wherein the stationary thrust bearing faces are between the rotatable thrust bearing faces and the spring means resiliently biases the stationary thrust bearing faces apart from each other.

8. A thrust bearing assembly as recited in claim 7 wherein each thrust bearing face comprises a material having a hardness of at least 8 on the Mohs scale.

9. A thrust bearing assembly as recited in claim 8 further comprising means for conveying drilling fluid through the interfaces between the opposed thrust bearing faces for forming hydrodynamic fluid bearing films in said interfaces.

10. A thrust bearing assembly as recited in claim 9 wherein each thrust bearing face comprises a plurality of polycrystalline diamond faces.

11. A thrust bearing assembly as recited in claim 7 wherein the spring means comprises a plurality of Belleville springs between the first and second stationary thrust bearing faces for biasing the stationary thrust bearing faces toward the respective rotatable bearing faces.

12. A thrust bearing assembly for a downhole motor comprising:

a stationary housing;

a rotatable shaft extending through the housing;

at least one pair of opposed thrust bearing faces comprising a metal substrate and a plurality of inserts embedded in and held by the metal substrate, each insert having polycrystalline diamond at the thrust bearing face;

the first thrust bearing face having a flat area in a radial plane, the second thrust bearing face having a plurality of sectors, each sector being tilted from a radial plane at an angle of up to a few degrees to facilitate forming a hydrodynamic fluid bearing film with the flat area;

spring means for resiliently biasing the pair of opposing thrust bearing faces toward face-to-face engagement; and means for conveying drilling fluid from said motor to the bearing faces during rotation of the shaft for providing a hydrodynamic fluid film in the thrust bearing interface.

13. The thrust bearing assembly of claim 12 wherein the sectors of the second thrust bearing face are divided by radially extending grooves in the bearing face which facilitate the conveying of drilling fluid to the bearing interface.

14. The thrust bearing assembly as recited in claim 12 wherein the means for conveying comprises:

passage means for delivering fluid to one radial edge of such a thrust bearing interface and passage means for receiving and removing fluid from the other radial edge of such thrust bearing interface for conveying fluid to the bearing faces during rotation of the shaft for providing a hydrodynamic fluid film in the thrust bearing interfaces.

15. A thrust bearing assembly as recited in claim 14 wherein at least one bearing face of each pair of opposed thrust bearing faces includes a plurality of generally radially extending grooves for distributing fluid in the thrust bearing interface.

16. A thrust bearing assembly for a downhole motor comprising:

a stationary housing;

a rotatable shaft extending through the housing;
at least one pair of opposed planar thrust bearing faces comprising:
a ring mounted on the housing and a ring mounted on the shaft, each of said rings comprising a metal substrate and a plurality of inserts embedded in and held by the metal substrate, in each of said rings, said inserts comprising right cylindrical supporting studs of tungsten carbide with flat end faces of polycrystalline diamond laying substantially in a common plane;
spring means for resiliently biasing the pair of opposing thrust bearing faces toward face-to-face engagement; and
means for conveying drilling fluid from said motor to the bearing faces during rotation of the shaft.

17. The thrust bearing assembly of claim 16 wherein the polycrystalline diamond end faces are displaced from the surface of the metal substrate in each of said rings.

18. A thrust bearing assembly for a downhole fluid motor comprising:
a stationary housing;
a rotatable shaft extending through the housing;
a lower rotatable thrust bearing ring mounted on the shaft and having an upwardly facing planar thrust bearing face;
an upper rotatable thrust bearing ring mounted on the shaft and having a downwardly facing planar thrust bearing face;
a lower stationary thrust bearing ring mounted in the housing and having a downwardly facing planar thrust bearing face in opposing engagement with the lower rotatable thrust bearing face;
an upper stationary thrust bearing ring mounted in the housing and having an upwardly facing planar thrust bearing face in opposing engagement with the upper rotatable thrust bearing face; and
a plurality of Belleville springs between the upper and lower stationary thrust bearing rings for resiliently biasing the upper thrust bearing faces toward engagement and resiliently biasing the lower thrust bearing faces toward engagement and for transmitting thrust between the upper and lower stationary thrust bearing rings.

19. A thrust bearing assembly as recited in claim 18 further comprising means for conveying fluid to the upper thrust bearing interface and to the lower thrust bearing interface for forming hydrodynamic fluid bearing films in said interfaces.

20. A thrust bearing assembly as recited in claim 19 wherein each thrust bearing face is formed of a material having a hardness of at least 8 on the Mohs scale.

21. A thrust bearing assembly as recited in claim 20 wherein each thrust bearing face comprises a plurality of inserts having polycrystalline diamond at the bearing face.

22. A thrust bearing assembly as recited in claim 18 wherein at least one of the upper thrust bearing rings comprises a plurality of generally radially extending grooves in the thrust bearing face for distributing fluid in the upper thrust bearing interface; and wherein at least one of the lower thrust bearing rings comprises a plurality of generally radially extending grooves in the thrust bearing face for distributing fluid in the lower thrust bearing interface.

23. A bearing assembly for a downhole fluid motor comprising:
a stationary housing;
a rotatable drive shaft extending through the housing;
means for connecting the housing to the housing of a downhole fluid motor;
means for connecting one end of the drive shaft to the drive shaft of a downhole fluid motor;
means for connecting the other end of the drive shaft to a rock bit;
a radial journal bearing sleeve fixed in the housing;
a radial journal bearing fixed on the drive shaft within the journal bearing sleeve; and
a bidirectional thrust bearing assembly comprising:
a first rotatable thrust bearing ring connected to the drive shaft and having a radially extending thrust bearing face;
a second rotatable thrust bearing ring connected to the drive shaft and having a radially extending thrust face facing in the opposite direction from the thrust face on the first rotatable thrust bearing ring;
a first stationary thrust bearing ring connected to the housing and having a radially extending thrust bearing face for engaging the thrust bearing face on the first rotatable thrust bearing ring;
a second stationary thrust bearing ring connected to the housing and having a radially extending thrust bearing face for engaging the thrust bearing face on the second rotatable thrust bearing ring; and
spring means for resiliently biasing the bearing faces on said first thrust bearing rings toward interengagement and for resiliently biasing the bearing faces on said second thrust bearing rings toward interengagement; and wherein
each pair of thrust bearing faces comprise a first thrust bearing face having a flat area in a radial plane and a second thrust bearing face having a plurality of sectors, each sector being tilted from a radial plane at an angle of up to a few degrees for forming a hydrodynamic fluid bearing film with the flat area.

24. A bearing assembly for a downhole fluid motor comprising:
a stationary housing;
a rotatable drive shaft extending through the housing;
means for connecting the housing to the housing of a downhole fluid motor;
means for connecting the other end of the drive shaft to a rock bit;
a radial journal bearing sleeve fixed in the housing; and
a bidirectional thrust bearing assembly comprising:
a first rotatable thrust bearing ring connected to the drive shaft and having a radially extending thrust bearing face;
a second rotatable thrust bearing ring connected to the drive shaft and having a radially extending thrust face facing in the opposite direction from the thrust face on the first rotatable thrust bearing ring;
a first stationary thrust bearing ring connected to the housing and having a radially extending thrust bearing face for engaging the thrust bearing face on the first rotatable thrust bearing ring;
a second stationary thrust bearing ring connected to the housing and having a radially extending thrust bearing face for engaging the thrust bearing face on the second rotatable thrust bearing ring;
the bearing faces of said first and second stationary thrust bearing rings being between the bearing faces of the rotatable thrust bearing rings;

spring means for resiliently biasing the bearing faces on said first thrust bearing rings toward interengagement and for resiliently biasing the bearing faces on said second thrust bearing rings toward interengagement; and wherein at least a portion of the thrust bearing rings each comprise a metal ring and a bearing member embedded in the metal ring forming the thrust bearing face, the bearing member having a hardness of at least 8 on the Mohs scale.

25. A bearing assembly as recited in claim 24 wherein the bearing member comprises a material selected from the group consisting of tungsten carbide, silicon carbide, aluminum oxide, and diamond.

26. A bearing assembly as recited in claim 24 wherein the bearing member comprises polycrystalline diamond at the thrust bearing surface.

27. A bearing assembly as recited in claim 24 wherein the bearing member comprises a material selected from the group consisting of tungsten carbide, silicon carbide, aluminum oxide, and diamond at the thrust bearing surface.

28. A bearing assembly as recited in claim 24 wherein the bearing member comprises a plurality of inserts arranged in a ring at the thrust bearing face.

29. A bearing assembly as recited in claim 24 further comprising means for introducing liquid between the interengaged thrust bearing faces for forming a hydrodynamic fluid bearing film in each thrust bearing interface.

30. A bearing assembly as recited in claim 29 further comprising means for conveying liquid between the radial journal bearing and journal bearing sleeve.

31. A bearing assembly as recited in claim 24 further comprising passage means for conveying drilling fluid from the fluid motor through the drive shaft to the rock bit and means for bypassing a portion of the drilling fluid between the first thrust bearing faces and between the second thrust bearing faces for forming a hydrodynamic fluid bearing film in each thrust bearing interface.

32. A bearing assembly as recited in claim 31 wherein each thrust bearing face comprises a material having a hardness of at least 8 on the Mohs scale.

33. A bearing assembly as recited in claim 32 wherein each thrust bearing face comprises a material selected from the group consisting of tungsten carbide, silicon carbide, aluminum oxide, and diamond.

34. A bearing assembly as recited in claim 31 wherein each thrust bearing face comprises a plurality of inserts having polycrystalline diamond at the thrust bearing face.

35. A thrust bearing assembly for a downhole fluid motor comprising:
a stationary housing;
means for connecting the housing to the housing of a downhole fluid motor;
a rotatable drive shaft extending through the housing;
means for connecting one end of the drive shaft to the drive shaft of the downhole fluid motor;
means for connecting a rock bit to the other end of the drive shaft;
an upper rotatable radial journal bearing sleeve fixed on the shaft;
an upper rotatable thrust bearing ring on the shaft connected to the upper rotatable journal bearing sleeve for rotation therewith and having a downwardly facing thrust bearing face;
a lower rotatable radial journal bearing sleeve fixed on the shaft;
a lower rotatable thrust bearing ring connected to the lower rotatable journal bearing sleeve for rotation therewith and having an upwardly facing thrust bearing face;
an upper stationary radial journal bearing sleeve in the housing surrounding the upper rotatable radial journal bearing sleeve;
an upper stationary thrust bearing ring connected to the upper stationary radial journal bearing sleeve, the upper stationary thrust bearing ring having an upwardly facing thrust bearing face opposite the downwardly facing thrust bearing face on the upper rotatable thrust bearing ring;
a lower stationary radial journal bearing sleeve in the housing surrounding the lower rotatable radial journal bearing sleeve;
a lower stationary thrust bearing ring connected to the lower stationary radial journal bearing sleeve and having a downwardly facing thrust bearing face opposite the upwardly facing thrust bearing face on the lower rotatable thrust bearing ring;
means for transmitting torque between the upper stationary thrust bearing ring and the lower stationary thrust bearing ring; and
spring means between the upper stationary thrust bearing ring and lower stationary thrust bearing ring for resiliently biasing said rings apart from each other.

36. A thrust bearing assembly for a downhole fluid motor comprising:
a stationary housing;
means for connecting the housing to the housing of a downhole fluid motor;
a rotatable drive shaft extending through the housing;
means for connecting one end of the drive shaft to the drive shaft of the downhole fluid motor;
means for connecting a rock bit to the other end of the drive shaft;
an upper rotatable radial journal bearing sleeve fixed on the shaft;
an upper rotatable thrust bearing ring on the shaft connected to the upper rotatable journal bearing sleeve for rotation therewith and having a downwardly facing thrust bearing face;
a lower rotatable radial journal bearing sleeve fixed on the shaft;
a lower rotatable thrust bearing ring connected to the lower rotatable journal bearing sleeve for rotation therewith and having an upwardly facing thrust bearing face;
an upper stationary radial journal bearing sleeve in the housing surrounding the upper rotatable radial journal bearing sleeve;
an upper stationary thrust bearing ring connected to the upper stationary radial journal bearing sleeve, the upper stationary thrust bearing ring having an upwardly facing thrust bearing face opposite the downwardly facing thrust bearing face on the upper rotatable thrust bearing ring;
a lower stationary radial journal bearing sleeve in the housing surrounding the lower rotatable radial journal bearing sleeve;
a lower stationary thrust bearing ring connected to the lower stationary radial journal bearing sleeve and having a downwardly facing thrust bearing face opposite the upwardly facing thrust bearing face on the lower rotatable thrust bearing ring;

means for transmitting torque between the upper stationary thrust bearing ring and the lower stationary thrust bearing ring; and spring means between the upper stationary thrust bearing ring and lower stationary thrust bearing ring and resiliently biasing said rings apart from each other;

a passage through the drive shaft for conveying drilling fluid from the downhole fluid motor to the rock bit; and means for bypassing a portion of the drilling fluid from the downhole fluid motor through the interfaces between the opposed radial journal bearing sleeves and between both pairs of opposed thrust bearing faces.

37. A thrust bearing assembly as recited in claim 36 wherein the spring means comprises a plurality of Belleville springs positioned for transmitting thrust between the upper and lower stationary thrust bearing rings.

38. A thrust bearing assembly as recited in claim 36 wherein each thrust bearing face comprises a material having a hardness of at least 8 on the Mohs scale.

39. A thrust bearing assembly as recited in claim 36 wherein each thrust bearing face comprises a material selected from the group consisting of tungsten carbide, silicon carbide, aluminum oxide, and diamond.

40. A thrust bearing assembly as recited in claim 36 wherein each thrust bearing face comprises polycrystalline diamond at the thrust bearing face.

41. A thrust bearing assembly as recited in claim 36 wherein each thrust bearing ring comprises a metal ring and a plurality of inserts embedded in the metal ring, each of said inserts having polycrystalline diamond at the thrust bearing face.

42. A thrust bearing assembly as recited in claim 36 wherein at least one bearing face in each pair of opposed thrust bearing rings includes a plurality of generally radially extending grooves for distributing drilling fluid to said bearing faces for forming a hydrodynamic fluid bearing film in each interface between the thrust bearing rings.

43. A thrust bearing assembly for a downhole motor comprising:

a stationary housing;

a rotatable shaft extending through the housing;

at least one pair of opposed planar thrust bearing faces comprising a stationary ring mounted on the housing and a rotatable ring mounted on the shaft, each of such rings comprising a metal substrate and an annular bearing face tessellated with triangles of polycrystalline diamond inserted in the metal substrate;

spring means for resiliently biasing the pair of opposing thrust bearing faces toward face-to-face engagement; and means for conveying drilling fluid from such a fluid motor to the bearing faces during rotation of the shaft for providing a fluid film in the thrust bearing interfaces.

44. A thrust bearing assembly as recited in claim 43 wherein at least one of the pair of thrust bearing faces includes a plurality of grooves for distributing drilling fluid to said bearing face.

45. A thrust bearing assembly as recited in claim 43 wherein the triangles are equilateral triangles.

46. A thrust bearing assembly as recited in claim 43 wherein the triangles each have a base extending in a generally circumferential direction and an apex extending in a generally radial direction.

47. A thrust bearing assembly as recited in claim 43 wherein the triangles are interleaved with generally parallel edges leaving webs of metal of substantially uniform width between adjacent triangles.

48. A thrust bearing assembly as recited in claim 43 wherein the triangles are in a plurality of circumferentially extending rows with triangles in adjacent rows interleaved for leaving webs of metal of substantially uniform width between the triangles in adjacent rows.

49. A thrust bearing assembly as recited in claim 43 wherein at least a portion of the triangles are arranged in a first inner circumferentially extending row, each of the triangles in the first row having a circumferentially extending base and a radially outwardly extending apex; and a second circumferentially extending row at least partly radially outward from the first row, each of the triangles in the second row having a circumferentially extending base and a radially inwardly extending apex.

50. A thrust bearing assembly as recited in claim 49 wherein at least a portion of the triangles are arranged in a third circumferentially extending row at least partly radially outward from the third row, each of the triangles in the third row having a circumferentially extending base and a radially outwardly extending apex; and a fourth circumferentially extending row at least partly radially outward from the third row, each of the triangles in the fourth row having a circumferentially extending base and a radially inwardly extending apex.

51. A thrust bearing assembly as recited in claim 49 wherein the radial apexes of the triangles in the first row are radially further outward than the radial apexes of the triangles in the second row.

52. A thrust bearing assembly as recited in claim 49 wherein the triangles in the first and second rows are interleaved with generally parallel edges leaving webs of metal of substantially uniform width between adjacent triangles.

* * * * *